July 13, 1926.

J. AMELE 1,592,591

APPARATUS FOR AND METHOD OF MAKING STUCCO BRICK SLABS

Filed May 29, 1925

INVENTOR
James Amele
BY
ATTORNEY

Patented July 13, 1926.

1,592,591

UNITED STATES PATENT OFFICE.

JAMES AMELE, OF BRONX, NEW YORK.

APPARATUS FOR AND METHOD OF MAKING STUCCO-BRICK SLABS.

Application filed May 29, 1925. Serial No. 33,630.

This invention relates to improvements in moulds, particularly moulds to be used for the making of stucco brick slabs, and it is the principal object of the invention to provide a mould which allows a simultaneous moulding of a plurality of stucco bricks to form slabs of a desired size.

Another object of the invention is the provision of a mould for making stucco brick slabs of varying sizes and of predetermined thicknesses.

A further object of the invention is the provision of a mould for making stucco brick slabs in which the mortar lines between the single bricks, have a desired width.

A still further object of the invention is the provision of a mould for making stucco bricks of a simple and inexpensive construction allowing the use of ordinary wire screens for the formation of the reinforcement for the slabs.

These and other objects and advantages of my invention will become more fully known as the description thereof proceeds, and will then be more particularly pointed out in the appended claims.

In the accompanying drawing, forming a material part of this disclosure:

Figures 1, 2:
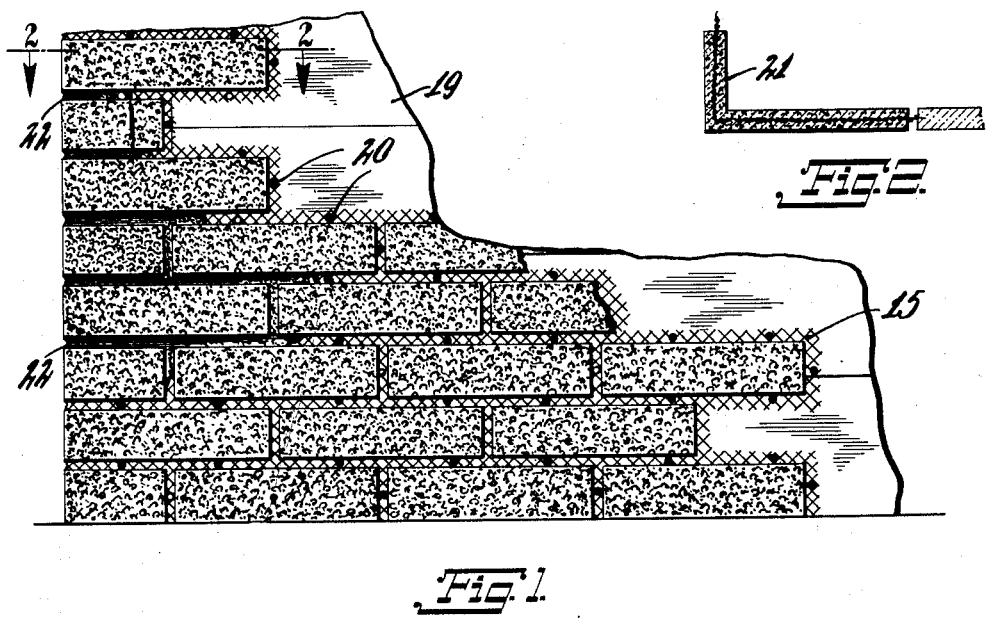
Fig. 1 is a fragmentary front elevation of a wall constructed by stucco brick slabs, made in a mould according to the present invention.
Fig. 2 is a section on line 2—2 of Figure 1.
Figure 3:
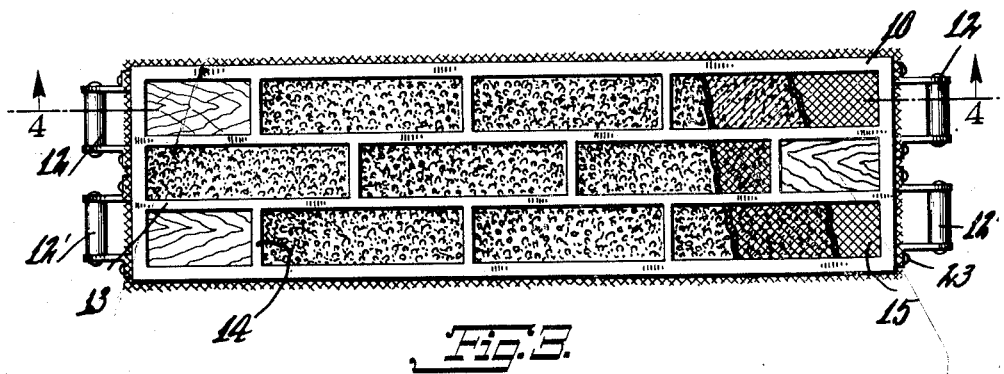
Fig. 3 is a top plan view of a mould constructed according to the present invention.
Figure 4:
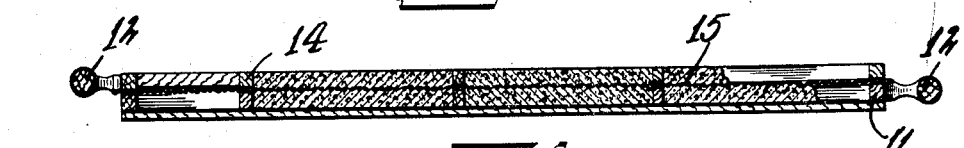
Fig. 4 is a longitudinal section through the same on line 4—4 of Figure 3.

The mould consists of a pair of superposed metal frames 10 and 11, having handles 12 and 12' respectively attached thereto. The bricks to be formed are outlined therein by longitudinally arranged iron bars 13 and cross bars 14 of a width corresponding to the size of mortar line desired between the single bricks and of a thickness corresponding to one-half the desired thickness of the bricks.

A wire screen 15 of any desired mesh is placed between the two parts of the mould, and the lower section of the mould comprises a number of longitudinally arranged iron bars and cross bars corresponding in size and width substantially, to the size and width of the bars 13 and 14.

The mould is filled with material from which the stucco brick slabs are to be formed, when wire and cover are in place, so that a slab of stucco bricks may be formed which can be removed from the mould by simply lifting the upper section, and turning the lower over, and lifting same, whereafter the moulding is taken away to dry.

Figures 5, 6:
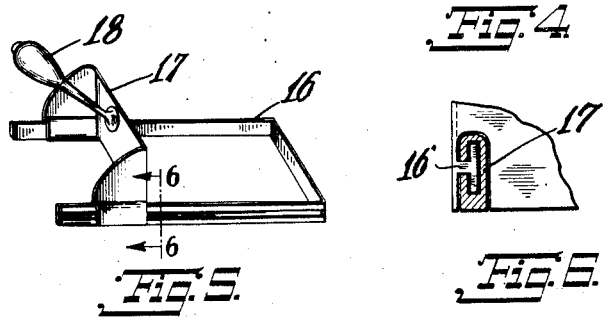
Fig. 5 is a perspective view of a tool used for the repairing of broken bricks.
Fig. 6 is a section on line 6—6 of Figure 5.

If it is desired to mould or repair one brick only, or any fraction of a brick, the tool 16, shown in Figure 5, is used, comprising a frame on which a movable element 17 is displaceable having a handle 18 formed therewith.

The wire screens are stretched by placing the cover over the mould, and the slabs are nailed to a wall frame 19, as shown at 20 in Figure 1.

It will be understood that any kind of plastic material, for instance, cement, sand, chips, marble dust, hair, finely crushed old bricks, or stone, etc., may be used, which may be colored in any desired manner.

The slabs are properly nailed to a wooden wall by working from the corners towards the center, and the mortar lines between the single bricks are then filled with regular mortar to give the whole, the appearance of a brick wall.

Around the corners, the stucco bricks are made in the manner shown in Figure 2, with a return end corner 21.

The slabs are formed in one layer with the wire screen 15 incorporated therein, and show the usual mortar lines 22.

If the ends of the stucco brick slabs, in some instances, remain uncovered, suitable mouldings may be used to conceal these ends.

If it is required to cut the slabs, the same are marked conspicuously and a V-cut is made in the same, whereafter the wire can be cut by any suitable tool and then the part to be discarded is simply tapped off by a hammer, or the like.

Two pivots 23 are arranged at the corners of the lower section as the mould is to be hinged or pivoted to a bench in order to allow a turning over of the mould to release the finished slab.

The tool 16 is only one-half of the thickness of the brick deep. It is to used only in "touching up" after the wall is all covered with slabs. A broken section of a brick, etc., is fixed by holding this single mould over the wire (already on the wall or in the slab) and filling pressing mixture in this mould.

It is to be understood that such changes may be made in the construction and the method of using the stucco brick moulds as fall within the scope of the appended claims without departing from the spirit and principle involved.

Having thus described my invention, what I claim as new, and desire to secure by Letters Patent, is:

1. A mould for making stucco-bricks comprising a box-like frame, means in said frame for allowing the formation of bricks of a desired size in one slab, and means for forming mortar lines between the single stucco bricks for imitating a brick wall.

2. A mould for making a stucco brick slab comprising a bi-partite metal box of the size of a slab to be made, longitudinally and cross-wise arranged metal bars in said box, of a thickness determined by the thickness of stucco bricks desired, and of a width corresponding to the width of the desired mortar lines between the single bricks, and a cover for said box having the identical number and size of the longitudinal and cross bars.

3. A mould for making stucco-brick slabs comprising a metal box, handles for said box, a plurality of brick mouldings determining the size of the brick slab to be made and the width of the mortar line between the single bricks, means allowing a central reinforcement for said slabs, a cover having a number of brick mouldings corresponding to the number of the first-named mouldings, and a means for allowing the formation of corner bricks.

4. A mould of the class described for making and repairing a brick, and a fraction thereof, comprising a frame of substantially T-shape in cross-section, a pressure exerting element adapted to slide along said frame, and means for operating said mould.

5. A method of covering wooden walls with stucco brick slabs consisting in forming at one time, a plurality of stucco bricks forming a slab, reinforcing said slabs, and nailing the same to a wall, forming mortar lines separating the single bricks, and filling said lines with mortar.

In testimony whereof I have affixed my signature.

JAMES AMELE.